(12) United States Patent
Dong et al.

(10) Patent No.: US 12,551,518 B2
(45) Date of Patent: Feb. 17, 2026

(54) PROBIOTIC SYSTEM AND USE THEREOF

(71) Applicant: NANJING UNIVERSITY, Nanjing (CN)

(72) Inventors: Lei Dong, Nanjing (CN); Congwei Han, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 420 days.

(21) Appl. No.: 18/040,079

(22) PCT Filed: Dec. 11, 2020

(86) PCT No.: PCT/CN2020/135847
§ 371 (c)(1),
(2) Date: Jan. 31, 2023

(87) PCT Pub. No.: WO2022/104959
PCT Pub. Date: May 27, 2022

(65) Prior Publication Data
US 2023/0302068 A1  Sep. 28, 2023

(30) Foreign Application Priority Data
Nov. 18, 2020 (CN) .................. 202011294674.9

(51) Int. Cl.
| | | |
|---|---|---|
| A61K 35/747 | (2015.01) | |
| A61K 35/742 | (2015.01) | |
| A61K 35/744 | (2015.01) | |
| A61K 35/745 | (2015.01) | |
| A61K 47/02 | (2006.01) | |
| A61P 1/04 | (2006.01) | |
| A61P 1/12 | (2006.01) | |
| A61P 1/16 | (2006.01) | |
| A61P 11/00 | (2006.01) | |
| A61P 17/00 | (2006.01) | |
| A61P 35/00 | (2006.01) | |

(52) U.S. Cl.
CPC .......... *A61K 35/747* (2013.01); *A61K 35/742* (2013.01); *A61K 35/744* (2013.01); *A61K 35/745* (2013.01); *A61K 47/02* (2013.01); *A61P 1/04* (2018.01); *A61P 1/12* (2018.01); *A61P 1/16* (2018.01); *A61P 11/00* (2018.01); *A61P 17/00* (2018.01); *A61P 35/00* (2018.01)

(58) Field of Classification Search
None
See application file for complete search history.

(56) References Cited

U.S. PATENT DOCUMENTS

| | | | |
|---|---|---|---|
| 2014/0369981 A1* | 12/2014 | Tian ..................... | A23C 11/106 435/252.9 |
| 2020/0129570 A1 | 4/2020 | Frankel et al. | |

FOREIGN PATENT DOCUMENTS

| | | |
|---|---|---|
| CN | 1536031 A | 10/2004 |
| CN | 108130296 A | 6/2018 |
| CN | 109803666 A | 5/2019 |
| CN | 110446497 A | 11/2019 |
| CN | 111012794 A | 4/2020 |
| CN | 111012804 A | 4/2020 |
| CN | 112972503 A | 6/2021 |

OTHER PUBLICATIONS

Hu B, "Bifidobacterium Longum as A Delivery System of TRAIL and Endostatin Cooperates with Chemotherapeutic Drugs to Inhibit Hypoxic Tumor Growth", Cancer Gene Therapy, vol. 16, 2009, pp. 655-663.
International Search Report and Written Opinion for PCT Application No. PCT/CN2020/135847, dated Aug. 12, 2021, 15 pages (3 pages of English translation and 12 pages of Official copy).
Kuang Xuyuan et al., "The Mechanism and Application of Probiotics in the Prevention and Treatment of Tumors", Chinese Journal of Microecology, vol. 23, No. 3, Mar. 31, 2011, English Abstract submitted.
Li Kaiyu, "Effect of bifidobacteria on immunotherapy of melanoma", Health Road, vol. 5, No. 17, May 31, 2018, English Abstract submitted.
Seki Yuji, "Abstract 2631: Enhanced Anti-Tumor Effects by A Combination Approach of Interferon-γ Producing Recombinant Bifidobacterium and Anti-mPD-1 Antibody in Syngeneic Mouse Model", Cancer Research, vol. 77, 2017, pp. 2631.
Sivan Ayelet, "Commensal Bifidobacterium Promotes Antitumor Immunity and Facilitates Anti-PD-L1 Efficacy", Science, vol. 350, No. 6264, 2015, pp. 1084-1089.

* cited by examiner

Primary Examiner — Brian Gangle
(74) Attorney, Agent, or Firm — JC ONE WORLD

(57) ABSTRACT

The present disclosure provides a system which enables exogenous probiotics to form a stable microenvironment in a host, can be applied by simple means such as oral administration, can achieve the effect of changing the composition of intestinal microbiota, and eventually plays a positive role in the treatment of malignant tumors.

4 Claims, 2 Drawing Sheets

PROBIOTIC SYSTEM AND USE THEREOF

CROSS-REFERENCE TO RELATED APPLICATIONS

This application is a U.S. national phase entry of PCT International Phase Application No. PCT/CN2020/135847, filed on Dec. 11, 2020, which claims priority to Chinese Patent Application No. CN202011294674.9, filed Nov. 18, 2020. The entire contents of the above referenced applications and of all priority documents referenced in the Application Data Sheet filed herewith are hereby incorporated by reference for all purposes.

FIELD

The present invention relates to probiotics, in particular relates to a probiotic system which can be used for medical purposes, and specifically relates to a probiotic system which can be used to treat malignant tumors.

BACKGROUND

Probiotics are active microorganisms that are beneficial to the host by colonizing in the human body and changing the composition of the flora in a certain part of the host, and mainly include lactic acid bacteria, bifidobacteria, actinomycetes, yeast and the like. They promote nutrient absorption and maintain intestinal health by regulating the immune function of the host mucosa and system or by regulating the balance of intestinal flora. Probiotics are generally considered to have multiple benefits to the human body, including improving the body's immunity, maintaining the balance of the intestinal flora structure, improving the body's antioxidant level, inhibiting intestinal inflammation, and protecting the intestinal mucosal barrier.

Some reports have indicated that intestinal probiotics also have an inhibitory effect on tumor growth, and have obvious effects in the treatment of malignant tumors. For example, according to the research by Gopalakrishnan et al. in 2018, the antitumor efficacy of probiotics is associated with immune activation. The intestinal flora of patients with cancer is different from that of healthy people. Bifidobacteria are the dominant flora in healthy people, but bifidobacteria are significantly reduced in some patients with cancer.

*Bifidobacterium* is a genus of Gram-positive, rod-shaped, sometimes branched end anaerobic probiotics, and widely exists in the digestive tract, vagina and oral cavity of humans and animals. Bifidobacteria can interact with human immune cells, regulate specific signaling pathways related to innate and adaptive immunity, and promote Th1 immune responses. Bifidobacteria are capable of enhancing the function of dendritic cells and the recruitment of $CD8^+$ T cells in the tumor microenvironment. In addition, since patients with malignant tumors will receive various treatments, these treatments will also have a huge impact on the composition of the microbiota. Therefore, it is of positive significance to help patients with malignant tumors to rebuild and optimize their intestinal flora structure.

However, the composition of gut microbiota needs to be changed in order to rebuild the gut microbiota to allow probiotics to have a positive effect in the human body. The currently reported methods to change the composition of gut microbiota are mainly fecal microbial transplantation and oral administration of probiotics. Fecal microbial transplantation is costly, complicated to operate, and prone to pathogen infection, and thus is not a preferred treatment option. Meanwhile, various current practices and attempts have shown that direct oral administration of probiotics has little effect, and can only temporarily change the composition of gut microbiota in a short period of time, which is too short for these probiotics to exert their efficacy. The reason for this phenomenon lies in that exogenous bacteria have a poor ability to inhabit the intestinal tract of the host and fail to form a stable aggregation and self-protection system, so they are apt to be directly cleared by the gastrointestinal environment.

Therefore, the present invention hopes to invent a system, which enables probiotics to reproduce stably on the one hand, and on the other, the system enables exogenous probiotics to form a stable microenvironment in the host, can be applied by simple means such as oral administration, can achieve the effect of changing the composition of intestinal microbiota, and eventually plays a positive role in the treatment of malignant tumors.

SUMMARY

In order to solve the problems mentioned in the background, the inventor creatively proposed the idea of using an inorganic material system to form a long-term stable flora system for exogenous probiotics in the organism, and established and optimized the system through a series of research with great medical application potential and value.

The present invention discloses a medically significant probiotic system, comprising probiotics and an inorganic material, wherein the probiotics may be a single strain or a mixed strain; the inorganic material may be a natural mineral material, a processed natural material, or an artificially prepared material.

Preferably, the probiotics constituting the probiotic system are probiotics that can generate an acidic environment during growth and reproduction, and the probiotics that can generate an acidic environment as described herein refer to the probiotics that form an acidic environment around the colony during their metabolism.

More preferably, the probiotics constituting the probiotic system are lactic acid bacteria.

Most preferably, the probiotics constituting the probiotic system are selected from the group consisting of *Lactobacillus, Bifidobacterium, Clostridium butyricum, Enterococcus faecalis*, and a mixture thereof.

Preferably, the inorganic material constituting the probiotic system is a material with cation exchange capacity and high surface area, and the material is selected from the group consisting of various cation exchange resin with a microporous structure, fluorite, dioctahedral smectites subgroup such as beidellite, montmorillonite and nontronite, trioctahedral smectites subgroup such as saponite, sauconite, hectorite and stevensite, diatomite, kaolin, attapulgite, illite, chlorite, sepiolite, zeolite, and talc.

More preferably, the inorganic material constituting the probiotic system is a material with a positive charge on the surface in an acidic environment.

Most preferably, the inorganic material constituting the probiotic system is a material that does not have a positive charge on the surface in a neutral or alkaline environment, but has a positive charge on the surface in an acidic environment. The artificial material may be mesoporous silica with a pore size of 2-50 nm; or a metal-organic framework compound selected from the group consisting of ZIF-67, UiO-66(Zr), MOF-74-Mg, Co-MOF-74, MIL-53 (Fe), MIL-101, MOF-74-Ni, Cu-BTC, MOF-74-Fe, ZIF-8

(Basolite Z1200), RMOF-1, MIL-100(Cr), MOF-5, Ce-BTC, MgDOBDC, and MIL-53(Al).

In some embodiments, the inorganic material constituting the probiotic system uses the natural or artificially processed mineral material from the smectite group, more specifically the natural or artificially processed mineral material from the montmorillonite subgroup.

In some other embodiments, the inorganic material constituting the probiotic system uses one of diatomite, kaolin or attapulgite.

In some other embodiments, the inorganic material constituting the probiotic system is an artificially prepared material with a positive charge on the surface in an acidic environment.

In order to form a stable and usable system of probiotics and an inorganic material, the inventors mixed a probiotic culture solution with an inorganic material suspension and continued to culture for a certain period of time, and then obtained a stable and usable mixed system.

A stable and usable system of probiotics and an inorganic material may be prepared as follows:
- S1: Activation and culture expansion of probiotics: performing anaerobic culture at 25-40° C., 0-200 rpm for 10 min-4 h;
- S2: Activation of an inorganic material: stirring the inorganic materials in isotonic buffer for 10 min-1 h;
- S3: Adsorption of probiotics on the surface of the inorganic material and formation and stabilization of a probiotic biofilm: mixing the inorganic material with probiotics at a ratio of 10:1-1:10 and performing anaerobic culture at 25-40° C., 0-200 rpm for 4 h-48 h;
- S4: Separating and purifying the finished product, and then freeze-drying to store at 4° C.

For the convenience of later administration, multiple options are provided for the administration method. The probiotic system of the present invention is in a form selected from the group consisting of a brewable solid form, a chewable solid form, an injectable injection, an oral liquid and an inhalable gaseous form. To obtain the above-mentioned forms, it is only necessary to process the stable probiotic system formed by the above-mentioned method through known conventional processing techniques.

Experiments have proved that the probiotic system obtained by the method disclosed in the present invention can allow exogenous probiotics to settle in the host stably, quickly and for a long time, thereby rebuilding and optimizing the intestinal microbial composition in the host. Therefore, it can be reasonably foreseen that as long as the reconstruction and optimization of intestinal microbial composition in the host can treat or alleviate diseases, the probiotic system disclosed in the present invention can certainly be used for the treatment of these diseases. These diseases include at least: diarrhea, constipation, indigestion, hypertension, lactase deficiency, lactose intolerance, vaginal infection, liver cirrhosis, peritonitis, enterogenous endotoxemia, atopic dermatitis, allergy, irritable bowel syndrome, periodontitis, mental illness, ulcerative colitis, and polycystic ovary syndrome.

In addition, a series of experiments demonstrate that the probiotic system of the present invention has a wide range of therapeutic effects and tumor growth inhibitory effects on malignant tumors. These malignant tumors include at least malignant melanoma, breast cancer, colorectal cancer, sarcoma, gastric cancer, liver cancer, lung cancer, cervical cancer or pancreatic cancer.

The probiotic system of the present invention can be used as a drug in the treatment of various malignant tumors, and can play an auxiliary role in the current existing treatment system. The probiotic system of the present invention, on the one hand, can be used as a health care product to help patients recover and rebuild the composition of gut microbiota during chemotherapy or immunotherapy, and on the other, can also be used as an adjuvant drug for chemotherapy and immunotherapy. Experiments have proved that the probiotic system of the present invention can significantly improve the effects of currently known chemotherapy and immunotherapy.

The present invention creatively combines the probiotics in the organism with the inorganic material system in vitro, and can form "bacteria-inorganic material-biofilm" composite microspheres through mixed culture. The microspheres can well solve the problem mentioned in the background, that is, the exogenous bacteria have a poor ability to inhabit the intestinal tract of the host, and are apt to be directly cleared by the gastrointestinal environment. The microspheres can be well adsorbed on the inner surface of the intestinal tract of the host, and provide a safe and reliable environment for the stable growth and reproduction of probiotics without being cleared by the host's own digestive system. Therefore, it can be foreseen that the technical solution of the present invention can achieve a certain effect on any disease for which the reconstruction or optimization of probiotics in the human intestinal tract has a certain therapeutic effect.

In addition to creatively proposing such a design idea, the inventors also conducted a lot of research and discovered the mechanism of the stable combination of the probiotics and inorganic material system and the final formation of "bacteria-inorganic material-biofilm" composite microspheres, thus summing up the characteristics of the inorganic material suitable for providing a stable growth environment for probiotics. Such inorganic material should have cation exchange capacity and a high surface area. More critically, the material should have a positive charge itself. A better choice is that the material does not have a positive charge in a neutral or alkaline environment, but has a positive charge in an acidic environment.

In addition, the inventors also found that the growth and reproduction of specific probiotics can be selectively promoted by using the most preferred inorganic material, for example, Lactobacillus and Bifidobacterium belong to the probiotics that are selectively promoted.

Lactobacillus and Bifidobacterium are Gram-positive bacteria, and theophyllic acid in their cell walls can be recognized by Toll-like receptor 2 (TLR2). These lactobacilli and bifidobacteria that form in the gut interact with dendritic cells through TLR2, activate the dendritic cells and drive them into tumors. Meanwhile, activated dendritic cells serve as key antigen-presenting cells (APCs) to play a central role in the process of priming T cells. Further research by the inventors revealed that the number of cytotoxic T cells (CD8$^+$) increased in both blood and tumors. In addition, the expression of several cytokines (IFN-γ, IL-12) that can promote anticancer immune responses were increased after the administration of the probiotic system. Therefore, it can be seen that the most preferred inorganic material of the present invention and its unique characteristics can maximize the effect of the probiotic system in the process of tumor treatment. Besides, since it selectively stimulates specific probiotics, it can ensure that other undesirable bacteria are kept at a low level, thus ensuring safety.

DETAILED DESCRIPTION

Figure 1:
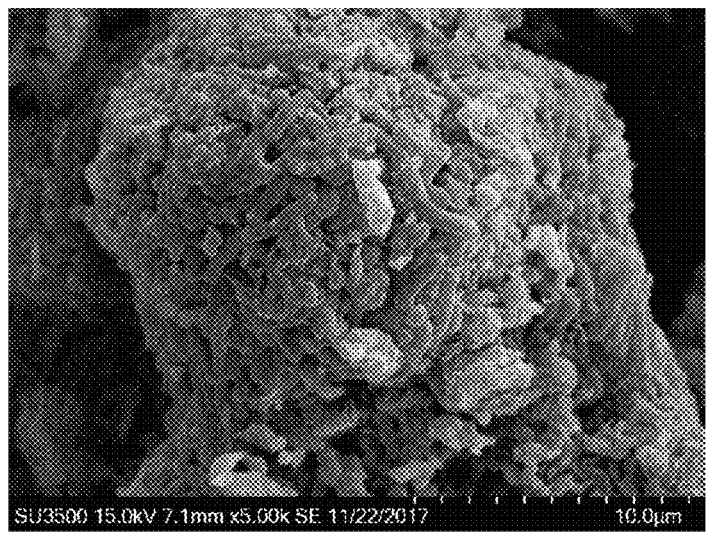
FIG. 1 is an electron micrograph of the biofilm of Bifidobacterium formed on the surface of montmorillonite.

In conjunction with the following examples, the present invention will be better understood.

Preparation for efficacy experiment of probiotics+inorganic material system:

(1) Culture and Preparation of Microorganisms

For effective comparison, *Bifidobacterium* (A), *Lactobacillus* (B), and *Escherichia coli* (negative control) (C) were selected. These three microorganisms were all from China General Microbiological Culture Collection Center (CGMCC), and anaerobically cultured in the manner described in the table below for use in subsequent experiments.

|  | Medium type | Culture temperature and time |
|---|---|---|
| *Bifidobacterium* | PYG medium | 37° C., 8 h |
| *Lactobacillus* | PYG medium | 37° C., 8 h |
| *Escherichia coli* | LB medium | 37° C., 8 h |

(2) Preparation of Inorganic Material

Preparation of several inorganic materials. For effective comparison, the following inorganic materials were prepared for experiments: montmorillonite (1), diatomite (2), kaolin (3), attapulgite (4), mesoporous silica (5), metal framework silica MOF-5 (6), mixture of montmorillonite and diatomite (7), mixture of montmorillonite and attapulgite (8), and mixture of montmorillonite and metal framework silica (9). The preparation processes of these materials were as follows:

The aseptically treated inorganic material particles were mixed with phosphate buffer saline (PBS), and stirred evenly to obtain the desired mineral material suspension. The aseptic treatment of inorganic materials was carried out by ultraviolet irradiation.

Among them, montmorillonite (1) was purchased from Simcere Pharmaceuticals, diatomite (2), kaolin (3), and attapulgite (4) were purchased from Alibaba, mesoporous silica (5) and metal framework silica MOF-5 (6) were purchased from Sigma, USA.

The particle size of inorganic materials was controlled at 300-600 mesh, about 20-50 microns. The concentration and proportion of various material systems are shown in the table below.

|  | Suspension concentration after mixing with PBS | Mixing ratio |
|---|---|---|
| Montmorillonite | 0.01 g/ml | — |
| Diatomite | 0.01 g/ml | — |
| Kaolin | 0.02 g/ml | — |
| Attapulgite | 0.01 g/ml | — |
| Mesoporous silica | 0.01 g/ml | — |
| Metal framework silica MOF-5 | 0.01 g/ml | — |
| Montmorillonite + diatomite | 0.01 g/ml | 1:1– |
| Montmorillonite + attapulgite | 0.01 g/ml | 1:1 |
| Mixture of montmorillonite + metal framework silica | 0.01 g/ml | 1:1 |

(3) Preparation of the Mixed System of Microorganism and Inorganic Material

After the microorganisms were cultured for a period of time according to the method in (1) Preparation of microorganisms, the inorganic material suspension was added to the culture medium in a certain ratio, mixed and cultured at 37° C. for a certain period of time. The specific ratio and mixed culture time are shown in the table below.

|  | Volume ratio of microbial culture solution to inorganic material suspension | Mixed culture time |
|---|---|---|
| *Bifidobacterium* + Montmorillonite | 5:1 | 24 h |
| *Bifidobacterium* + Diatomite | 10:1 | 48 h |
| *Bifidobacterium* + Kaolin | 20:1 | 24 h |
| *Bifidobacterium* + Attapulgite | 10:1 | 72 h |
| *Bifidobacterium* + Artificially prepared microporous and metal framework silica MOF-5 | 5:1 | 48 h |
| *Bifidobacterium* + (Montmorillonite + diatomite) | 10:(1 + 1) | 48 h |
| *Bifidobacterium* + (Montmorillonite + attapulgite) | 10:(1 + 1) | 48 h |
| *Bifidobacterium* + (Mixture of montmorillonite + metal framework silica) | 10:(1 + 1) | 48 h |
| *Lactobacillus* + Montmorillonite | 5:1 | 24 h |
| *Lactobacillus* + Diatomite | 10:1 | 48 h |
| *Lactobacillus* + Kaolin | 20:1 | 24 h |
| *Lactobacillus* + Attapulgite | 10:1 | 72 h |
| *Lactobacillus* + Artificially prepared microporous and metal framework silica MOF-5 | 5:1 | 48 h |
| *Lactobacillus* + (Montmorillonite + diatomite) | 10:(1 + 1) | 48 h |
| *Lactobacillus* + (Montmorillonite + attapulgite) | 10:(1 + 1) | 48 h |
| *Lactobacillus* + (Mixture of montmorillonite + metal framework silica) | 10:(1 + 1) | 48 h |
| *Escherichia coli* + Montmorillonite | 5:1 | 24 h |
| *Escherichia coli* + Diatomite | 10:1 | 48 h |
| *Escherichia coli* + Kaolin | 20:1 | 24 h |
| *Escherichia coli* + Attapulgite | 10:1 | 72 h |
| *Escherichia coli* + Artificially prepared microporous and metal framework silica MOF-5 | 50:1 | 48 h |
| *Escherichia coli* + (Montmorillonite + diatomite) | 10:(1 + 1) | 48 h |
| *Escherichia coli* + (Montmorillonite + attapulgite) | 10:(1 + 1) | 48 h |
| *Escherichia coli* + (Mixture of montmorillonite + metal framework silica) | 10:(1 + 1) | 48 h |

(4) Separation and Purification of Finished Product

The combination of the microorganism and the inorganic material was separated from the liquid by centrifugation at 1000 rpm for 5 min. The precipitate obtained by centrifugation was washed with the isotonic buffer used in step (2) to obtain a purified combination of the microorganism and the inorganic material.

The combination of the microorganism and the inorganic material was resuspended in the buffer to obtain a suspension with a concentration of 0.01 g/ml for use.

Figure 2:
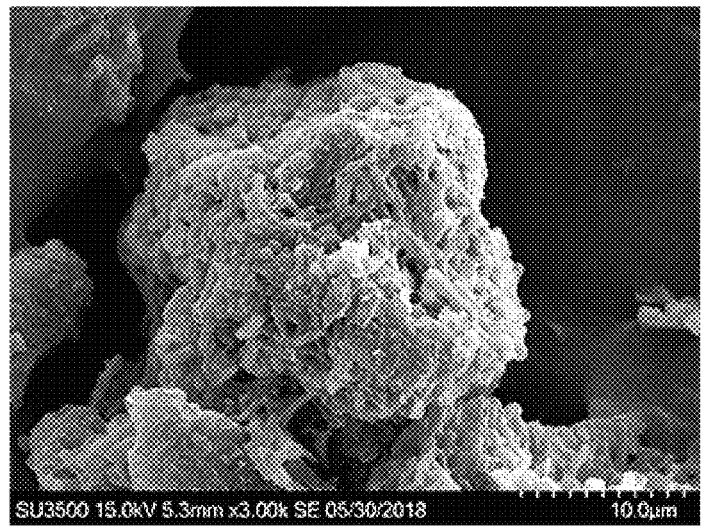
FIG. 2 is an electron micrograph of the biofilm of *Lactobacillus* formed on the surface of montmorillonite.

FIG. 1 and FIG. 2 are electron micrographs of the biofilms of *Bifidobacterium* and *Lactobacillus* formed on the surface of montmorillonite, respectively, indicating that the expected combination of the microorganism and the inorganic material was obtained through the above method.

(5) Mouse Experiments

In order to verify the effect of the present invention, a variety of disease model mice had been prepared. The objects to test the effect included: pure PBS, pure microbial culture solution *Bifidobacterium* (indicated by A in the table below), *Lactobacillus* (indicated by B in the table below) and *Escherichia coli* (indicated by C in the table below), pure inorganic material suspension montmorillonite (indicated by 1 in the table below), diatomite (indicated by 2 in the table below), kaolin (indicated by 3 in the table below), attapulgite (indicated by 4 in the table below), artificially prepared microporous and metal framework silica MOF-5 (indicated by 5 and 6 in the table below), montmorillonite+diatomite (indicated by 7 in the table below), montmorillonite+attapulgite (indicated by 8 in the table below), and mixture of montmorillonite+metal framework silica (indicated by 9 in the table below), mixture obtained just after mixing microbial culture solution and inorganic material suspension indicated by FA+(1)-(9), FB+(1)-(9) and FC+(1)-(9) in the table below, and mixture obtained after mixed culture of microbial culture solution and inorganic material suspension indicated by SA+(1)-(9), SB+(1)-(9) and SC+(1)-(9).

In addition, since the effect of the probiotic mixed system is based on the digestive tract system of organisms, the effect cannot be verified by cell experiments, and must be tested by biological experiments in vivo. Therefore, the present invention has adopted common mouse experiment to verify the effect. Specifically, the change in tumor weight between the control group and the treatment group was used to evaluate the tumor inhibition rate by: tumor inhibition rate=(tumor weight of the control group−tumor weight of the treatment group)÷tumor weight of the control group×100%. In some cases, the test object in the treatment group was invalid, and there would be a negative tumor inhibition rate. For the convenience of data processing, the case of a negative number and the tumor inhibition rate lower than 3% were uniformly represented by 0. These cases represented no effect on the subjects tested for that treatment group.

In addition, 10 repetitions were set up for each experimental subject (that is, 10 mice were used for each system), and the average tumor weight was used as the basis for calculation.

In addition, in order to verify the combined effect of various subjects and the current common chemotherapeutics and immunotherapy preparations, the inventors also set up two sets of experiments: SA+(1)-(9), SB+(1)-(9), and SC+(1)-(9) combined with adriamycin (ADM), and SA+(1)-(9), SB+(1)-(9), and SC+(1)-(9) combined with PD1. The conditions for using adriamycin were as follows: 18-20 g mice were intraperitoneally injected with adriamycin at a dose of 3 mg/kg, starting from the fourth day after tumor implantation, once every two days.

The conditions for using PD1 were as follows: 18-20 g mice were injected with PD1 antibody through the tail vein at a dose of 10 mg/kg, starting from the fourth day after tumor implantation, once every two days.

Example 1: Experiment on Melanoma Mice

B16-F10 cells were obtained from the Cell Resource Center of Shanghai Institutes for Biological Sciences, Chinese Academy of Sciences; SPF-grade C57BL/6J mice weighing 18-20 grams were purchased from the Animal Experiment Center of Yangzhou University.

The above-mentioned experimental objects were injected into the stomach of C57BL/6J mice by intragastric administration at a dosage calculated according to the amount of 0.01 g of mineral material for each mouse, once every two days for a total of two weeks. On Day 15, the B16-F10 tumor cells were counted by a hemocytometer, then adjusted to $5 \times 10^6$/ml, and inoculated subcutaneously in the axilla of the right forelimb of the mouse (0.1 ml/mouse) to establish a tumor model. 20 days after tumor implantation and 24 h after the last administration, they were killed by dislocation of the cervical vertebra, and the tumor was stripped off and weighed. The tumor inhibition rate of the mineral material and probiotic mineral material composite preparation was calculated according to the change of tumor weight to evaluate the therapeutic effect of the tumor. The results are shown in the table below:

| Group | PBS | A | B | C | 1 | 2 | 3 | 4 | 5 |
|---|---|---|---|---|---|---|---|---|---|
| Inhibition rate % | 0 | 27.1 | 22.4 | 0 | 32.1 | 21.2 | 19.4 | 25.6 | 29.8 |
| Group | 6 | 7 | 8 | 9 | FA + 1 | FA + 2 | FA + 3 | FA + 4 | FA + 5 |
| Inhibition rate % | 34.6 | 30.6 | 31.5 | 31 | 45.1 | 30.2 | 29.8 | 33.6 | 38.7 |
| Group | FA + 6 | FA + 7 | FA + 8 | FA + 9 | FB + 1 | FB + 2 | FB + 3 | FB + 4 | FB + 5 |
| Inhibition rate % | 47.2 | 39.8 | 41.6 | 40.7 | 44.6 | 29.1 | 28.7 | 31.7 | 36.5 |
| Group | FB + 6 | FB + 7 | FB + 8 | FB + 9 | FC + 1 | FC + 2 | FC + 3 | FC + 4 | FC + 5 |
| Inhibition rate % | 43.6 | 38.2 | 41.1 | 39.8 | 17.5 | 10.4 | 8.5 | 12.4 | 13.6 |
| Group | FC + 6 | FC + 7 | FC + 8 | FC + 9 | SA + 1 | SA + 2 | SA + 3 | SA + 4 | SA + 5 |
| Inhibition rate % | 18.9 | 14.5 | 16.7 | 16.2 | 72.5 | 51.3 | 39.2 | 45.9 | 49.6 |
| Group | SA + 6 | SA + 7 | SA + 8 | SA + 9 | SB + 1 | SB + 2 | SB + 3 | SB + 4 | SB + 5 |
| Inhibition rate % | 75.3 | 59.2 | 62.1 | 60.2 | 65.5 | 49.8 | 38.8 | 44.6 | 47.5 |
| Group | SB + 6 | SB + 7 | SB + 8 | SB + 9 | SC + 1 | SC + 2 | SC + 3 | SC + 4 | SC + 5 |
| Inhibition rate % | 72.2 | 58.3 | 60.4 | 57.3 | 0 | 0 | 0 | 0 | 0 |
| Group | SC + 6 | SC + 7 | SC + 8 | SC + 9 | ADM + SA + 1 | ADM + SA + 2 | ADM + SA + 3 | ADM + SA + 4 | ADM + SA + 5 |
| Inhibition rate % | 0 | 0 | 0 | 0 | 82.3 | 60.3 | 50.2 | 58.3 | 60.2 |

-continued

| Group | ADM + SA + 6 | ADM + SA + 7 | ADM + SA + 8 | ADM + SA + 9 | ADM + SB + 1 | ADM + SB + 2 | ADM + SB + 3 | ADM + SB + 4 | ADM + SB + 5 |
|---|---|---|---|---|---|---|---|---|---|
| Inhibition rate % | 82.5 | 67.5 | 70.2 | 68.9 | 73.3 | 59.3 | 48.6 | 53.2 | 58.2 |
| Group | ADM + SB + 6 | ADM + SB + 7 | ADM + SB + 8 | ADM + SB + 9 | ADM + SC + 1 | ADM + SC + 2 | ADM + SC + 3 | ADM + SC + 4 | ADM + SC + 5 |
| Inhibition rate % | 81.1 | 68.2 | 71.1 | 66.2 | 30.2 | 30.5 | 31.6 | 31.8 | 33.5 |
| Group | ADM + SC + 6 | ADM + SC + 7 | ADM + SC + 8 | ADM + SC + 9 | PD1 + SA + 1 | PD1 + SA + 2 | PD1 + SA + 3 | PD1 + SA + 4 | PD1 + SA + 5 |
| Inhibition rate % | 33.8 | 36.7 | 30.1 | 32.8 | 93.1 | 71.1 | 63.1 | 67.9 | 71.2 |
| Group | PD1 + SA + 6 | PD1 + SA + 7 | PD1 + SA + 8 | PD1 + SA + 9 | PD1 + SB + 1 | PD1 + SB + 2 | PD1 + SB + 3 | PD1 + SB + 4 | PD1 + SB + 5 |
| Inhibition rate % | 94.1 | 78.1 | 81.1 | 77.9 | 84.1 | 71.1 | 60.9 | 65.1 | 70.5 |
| Group | PD1 + SB + 6 | PD1 + SB + 7 | PD1 + SB + 8 | PD1 + SB + 9 | PD1 + SC + 1 | PD1 + SC + 2 | PD1 + SC + 3 | PD1 + SC + 4 | PD1 + SC + 5 |
| Inhibition rate % | 90.4 | 79.1 | 80.5 | 79.3 | 40.2 | 40.5 | 45.7 | 48.5 | 44.7 |
| Group | PD1 + SC + 6 | PD1 + SC + 7 | PD1 + SC + 8 | PD1 + SC + 9 | | ADM | | PD1 | |
| Inhibition rate % | 46.2 | 48.9 | 49.2 | 41.5 | | 32.1 | | 45.3 | |

Example 2: Experiment on Breast Cancer Mice

4T1 cells were obtained from the Cell Resource Center of Shanghai Institutes for Biological Sciences, Chinese Academy of Sciences; SPF-grade BALB/c mice weighing 18-20 grams were purchased from the Animal Experiment Center of Yangzhou University.

The above-mentioned experimental objects were injected into the stomach of BALB/c mice by intragastric administration at a dosage calculated according to the amount of 0.01 g of mineral material for each mouse, once every two days for a total of two weeks. On Day 15, the 4T1 tumor cells were counted by a hemocytometer, then adjusted to $5 \times 10^6$/ml, and inoculated subcutaneously in the axilla of the right forelimb of the mouse (0.1 ml/mouse) to establish a tumor model. 25 days after tumor implantation and 24 h after the last administration, they were killed by dislocation of the cervical vertebra, and the tumor was stripped off and weighed. The tumor inhibition rate of the mineral material and probiotic mineral material composite preparation was calculated according to the change of tumor weight to evaluate the therapeutic effect of the tumor. The results are shown in the table below:

| Group | PBS | A | B | C | 1 | 2 | 3 | 4 | 5 |
|---|---|---|---|---|---|---|---|---|---|
| Inhibition rate % | 0 | 18.2 | 15.6 | 0 | 36.9 | 24.2 | 18.4 | 28.4 | 26.5 |
| Group | 6 | 7 | 8 | 9 | FA + 1 | FA + 2 | FA + 3 | FA + 4 | FA + 5 |
| Inhibition rate % | 30.1 | 27.7 | 32.6 | 33.9 | 46.2 | 28.1 | 26.7 | 30.9 | 35.4 |
| Group | FA + 6 | FA + 7 | FA + 8 | FA + 9 | FB + 1 | FB + 2 | FB + 3 | FB + 4 | FB + 5 |
| Inhibition rate % | 45.3 | 37.5 | 38.1 | 37.9 | 42.4 | 27.3 | 25.1 | 30.0 | 34.5 |
| Group | FB + 6 | FB + 7 | FB + 8 | FB + 9 | FC + 1 | FC + 2 | FC + 3 | FC + 4 | FC + 5 |
| Inhibition rate % | 40.4 | 35.1 | 39.3 | 36.1 | 15.0 | 8.2 | 9.1 | 11.2 | 10.4 |
| Group | FC + 6 | FC + 7 | FC + 8 | FC + 9 | SA + 1 | SA + 2 | SA + 3 | SA + 4 | SA + 5 |
| Inhibition rate % | 17.2 | 15.1 | 12.6 | 16.3 | 68.1 | 50.1 | 45.4 | 44 | 45.1 |
| Group | SA + 6 | SA + 7 | SA + 8 | SA + 9 | SB + 1 | SB + 2 | SB + 3 | SB + 4 | SB + 5 |
| Inhibition rate % | 69.0 | 55.1 | 58.3 | 53.1 | 51.2 | 43.1 | 37.1 | 41.5 | 43.1 |
| Group | SB + 6 | SB + 7 | SB + 8 | SB + 9 | SC + 1 | SC + 2 | SC + 3 | SC + 4 | SC + 5 |
| Inhibition rate % | 66.1 | 51.2 | 55.1 | 53.4 | 0 | 0 | 0 | 0 | 0 |
| Group | SC + 6 | SC + 7 | SC + 8 | SC + 9 | ADM + SA + 1 | ADM + SA + 2 | ADM + SA + 3 | ADM + SA + 4 | ADM + SA + 5 |
| Inhibition rate % | 0 | 0 | 0 | 0 | 78.3 | 58.2 | 49.1 | 51.4 | 53.1 |
| Group | ADM + SA + 6 | ADM + SA + 7 | ADM + SA + 8 | ADM + SA + 9 | ADM + SB + 1 | ADM + SB + 2 | ADM + SB + 3 | ADM + SB + 4 | ADM + SB + 5 |
| Inhibition rate % | 78.1 | 65.1 | 67.3 | 62.1 | 64.1 | 57.4 | 47.1 | 52.9 | 55.4 |
| Group | ADM + SB + 6 | ADM + SB + 7 | ADM + SB + 8 | ADM + SB + 9 | ADM + SC + 1 | ADM + SC + 2 | ADM + SC + 3 | ADM + SC + 4 | ADM + SC + 5 |
| Inhibition rate % | 79.7 | 63.5 | 66.6 | 63.1 | 29.1 | 28.4 | 29.5 | 30.4 | 31.5 |
| Group | ADM + SC + 6 | ADM + SC + 7 | ADM + SC + 8 | ADM + SC + 9 | PD1 + SA + 1 | PD1 + SA + 2 | PD1 + SA + 3 | PD1 + SA + 4 | PD1 + SA + 5 |

-continued

| Group | | | | | | | | | |
|---|---|---|---|---|---|---|---|---|---|
| Inhibition rate % | 32.9 | 35.1 | 30.9 | 30.1 | 89.7 | 69.0 | 61.2 | 66.6 | 71.0 |
| Group | PD1 + SA + 6 | PD1 + SA + 7 | PD1 + SA + 8 | PD1 + SA + 9 | PD1 + SB + 1 | PD1 + SB + 2 | PD1 + SB + 3 | PD1 + SB + 4 | PD1 + SB + 5 |
| Inhibition rate % | 90.2 | 77.9 | 80.4 | 76.3 | 82.7 | 71.6 | 60.1 | 66.1 | 69.6 |
| Group | PD1 + SB + 6 | PD1 + SB + 7 | PD1 + SB + 8 | PD1 + SB + 9 | PD1 + SC + 1 | PD1 + SC + 2 | PD1 + SC + 3 | PD1 + SC + 4 | PD1 + SC + 5 |
| Inhibition rate % | 88.3 | 77.2 | 80.0 | 78.6 | 50.1 | 50.9 | 49.1 | 52.2 | 55.1 |
| Group | PD1 + SC + 6 | PD1 + SC + 7 | PD1 + SC + 8 | PD1 + SC + 9 | | ADM | | PD1 | |
| Inhibition rate % | 49.1 | 47.5 | 50.1 | 51.2 | | 31.9 | | 50.1 | |

Example 3: Experiment on Colon Cancer Mice

MC38 cells were obtained from the Cell Resource Center of Shanghai Institutes for Biological Sciences, Chinese Academy of Sciences; SPF-grade C57BL/6J mice weighing 18-20 grams were purchased from the Animal Experiment Center of Yangzhou University.

The above-mentioned experimental objects were injected into the stomach of C57BL/6J mice by intragastric administration at a dosage calculated according to the amount of 0.01 g of mineral material for each mouse, once every two days for a total of two weeks. On Day 15, the MC38 tumor cells were counted by a hemocytometer, then adjusted to $5\times10^6$/ml, and inoculated subcutaneously in the axilla of the right forelimb of the mouse (0.1 ml/mouse) to establish a tumor model. 25 days after tumor implantation and 24 h after the last administration, they were killed by dislocation of the cervical vertebra, and the tumor was stripped off and weighed. The tumor inhibition rate of the mineral material and probiotic mineral material composite preparation was calculated according to the change of tumor weight to evaluate the therapeutic effect of the tumor. The results are shown in the table below:

| Group | PBS | A | B | C | 1 | 2 | 3 | 4 | 5 |
|---|---|---|---|---|---|---|---|---|---|
| Inhibition rate % | 0 | 20.3 | 19.8 | 0 | 34.6 | 30.8 | 20.3 | 24.8 | 22.1 |
| Group | 6 | 7 | 8 | 9 | FA + 1 | FA + 2 | FA + 3 | FA + 4 | FA + 5 |
| Inhibition rate % | 28.2 | 26.1 | 30.4 | 32.1 | 40.3 | 34.1 | 24.8 | 28.2 | 26.8 |
| Group | FA + 6 | FA + 7 | FA + 8 | FA + 9 | FB + 1 | FB + 2 | FB + 3 | FB + 4 | FB + 5 |
| Inhibition rate % | 35.1 | 33.2 | 37.3 | 39.8 | 38.1 | 31.5 | 25.4 | 27.6 | 24.6 |
| Group | FB + 6 | FB + 7 | FB + 8 | FB + 9 | FC + 1 | FC + 2 | FC + 3 | FC + 4 | FC + 5 |
| Inhibition rate % | 34.5 | 31.4 | 36.9 | 35.5 | 14.7 | 9.4 | 10.5 | 12.7 | 11.2 |
| Group | FC + 6 | FC + 7 | FC + 8 | FC + 9 | SA + 1 | SA + 2 | SA + 3 | SA + 4 | SA + 5 |
| Inhibition rate % | 16.8 | 14.9 | 13 | 15.7 | 66.2 | 40.6 | 37.6 | 27.8 | 41.5 |
| Group | SA + 6 | SA + 7 | SA + 8 | SA + 9 | SB + 1 | SB + 2 | SB + 3 | SB + 4 | SB + 5 |
| Inhibition rate % | 61.8 | 46.8 | 49.7 | 51.7 | 48.7 | 41.6 | 33.9 | 39.4 | 35.7 |
| Group | SB + 6 | SB + 7 | SB + 8 | SB + 9 | SC + 1 | SC + 2 | SC + 3 | SC + 4 | SC + 5 |
| Inhibition rate % | 55.4 | 49.3 | 57.4 | 56.7 | 0 | 0 | 0 | 0 | 0 |
| Group | SC + 6 | SC + 7 | SC + 8 | SC + 9 | ADM + SA + 1 | ADM + SA + 2 | ADM + SA + 3 | ADM + SA + 4 | ADM + SA + 5 |
| Inhibition rate % | 0 | 0 | 0 | 0 | 74.6 | 55.6 | 51.4 | 42.6 | 54.7 |
| Group | ADM + SA + 6 | ADM + SA + 7 | ADM + SA + 8 | ADM + SA + 9 | ADM + SB + 1 | ADM + SB + 2 | ADM + SB + 3 | ADM + SB + 4 | ADM + SB + 5 |
| Inhibition rate % | 76.9 | 61.3 | 65.9 | 63.2 | 61.8 | 55.9 | 48.5 | 53.8 | 48.3 |
| Group | ADM + SB + 6 | ADM + SB + 7 | ADM + SB + 8 | ADM + SB + 9 | ADM + SC + 1 | ADM + SC + 2 | ADM + SC + 3 | ADM + SC + 4 | ADM + SC + 5 |
| Inhibition rate % | 69.8 | 61.7 | 71.5 | 69 | 30.5 | 33.1 | 28.3 | 31.5 | 30.5 |
| Group | ADM + SC + 6 | ADM + SC + 7 | ADM + SC + 8 | ADM + SC + 9 | PD1 + SA + 1 | PD1 + SA + 2 | PD1 + SA + 3 | PD1 + SA + 4 | PD1 + SA + 5 |
| Inhibition rate % | 29.9 | 30.1 | 33.6 | 33.6 | 85.6 | 71.9 | 70.3 | 69.7 | 75.8 |
| Group | PD1 + SA + 6 | PD1 + SA + 7 | PD1 + SA + 8 | PD1 + SA + 9 | PD1 + SB + 1 | PD1 + SB + 2 | PD1 + SB + 3 | PD1 + SB + 4 | PD1 + SB + 5 |
| Inhibition rate % | 89.3 | 79.9 | 81.3 | 78.4 | 80.6 | 73.5 | 66.8 | 68.3 | 71.6 |
| Group | PD1 + SB + 6 | PD1 + SB + 7 | PD1 + SB + 8 | PD1 + SB + 9 | PD1 + SC + 1 | PD1 + SC + 2 | PD1 + SC + 3 | PD1 + SC + 4 | PD1 + SC + 5 |
| Inhibition rate % | 90.3 | 78.3 | 81.2 | 76.3 | 52.4 | 51.8 | 55.1 | 50.3 | 56.7 |

-continued

| Group | PD1 + SC + 6 | PD1 + SC + 7 | PD1 + SC + 8 | PD1 + SC + 9 | ADM | PD1 |
|---|---|---|---|---|---|---|
| Inhibition rate % | 47.8 | 49.2 | 51.6 | 53.4 | 29.1 | 46.1 |

Example 4: Experiment on Osteosarcoma Mice

S180 cells were obtained from the Cell Resource Center of Shanghai Institutes for Biological Sciences, Chinese Academy of Sciences; SPF-grade C57BL/6J mice weighing 18-20 grams were purchased from the Animal Experiment Center of Yangzhou University.

The above-mentioned experimental objects were injected into the stomach of C57BL/6J mice by intragastric administration at a dosage calculated according to the amount of 0.01 g of mineral material for each mouse, once every two days for a total of two weeks. On Day 15, the S180 tumor cells were counted by a hemocytometer, then adjusted to $5 \times 10^6$/ml, and inoculated subcutaneously in the axilla of the right forelimb of the mouse (0.1 ml/mouse) to establish a tumor model. 30 days after tumor implantation and 24 h after the last administration, they were killed by dislocation of the cervical vertebra, and the tumor was stripped off and weighed. The tumor inhibition rate of the mineral material and probiotic mineral material composite preparation was calculated according to the change of tumor weight to evaluate the therapeutic effect of the tumor. The results are shown in the table below:

| Group | PBS | A | B | C | 1 | 2 | 3 | 4 | 5 |
|---|---|---|---|---|---|---|---|---|---|
| Inhibition rate % | 0 | 20.1 | 18.9 | 0 | 37.2 | 25 | 20 | 26.1 | 24.6 |
| Group | 6 | 7 | 8 | 9 | FA + 1 | FA + 2 | FA + 3 | FA + 4 | FA + 5 |
| Inhibition rate % | 29.3 | 27.4 | 31.5 | 33.4 | 45.1 | 33.2 | 25.3 | 29.3 | 29.4 |
| Group | FA + 6 | FA + 7 | FA + 8 | FA + 9 | FB + 1 | FB + 2 | FB + 3 | FB + 4 | FB + 5 |
| Inhibition rate % | 34.3 | 31.3 | 36.4 | 38.7 | 41.5 | 33.7 | 26.8 | 28.5 | 28.4 |
| Group | FB + 6 | FB + 7 | FB + 8 | FB + 9 | FC + 1 | FC + 2 | FC + 3 | FC + 4 | FC + 5 |
| Inhibition rate % | 33.1 | 30.5 | 33.8 | 36.9 | 15.6 | 10.8 | 13.6 | 14.6 | 12.1 |
| Group | FC + 6 | FC + 7 | FC + 8 | FC + 9 | SA + 1 | SA + 2 | SA + 3 | SA + 4 | SA + 5 |
| Inhibition rate % | 14.7 | 15.8 | 16.1 | 13.5 | 62.7 | 51.1 | 46.7 | 37.2 | 42.6 |
| Group | SA + 6 | SA + 7 | SA + 8 | SA + 9 | SB + 1 | SB + 2 | SB + 3 | SB + 4 | SB + 5 |
| Inhibition rate % | 63.1 | 48.3 | 51.6 | 53.5 | 51.7 | 44.7 | 36.6 | 42.3 | 36.8 |
| Group | SB + 6 | SB + 7 | SB + 8 | SB + 9 | SC + 1 | SC + 2 | SC + 3 | SC + 4 | SC + 5 |
| Inhibition rate % | 57.3 | 51.2 | 59.3 | 54.2 | 0 | 0 | 0 | 0 | 0 |
| Group | SC + 6 | SC + 7 | SC + 8 | SC + 9 | ADM + SA + 1 | ADM + SA + 2 | ADM + SA + 3 | ADM + SA + 4 | ADM + SA + 5 |
| Inhibition rate % | 0 | 0 | 0 | 0 | 76.8 | 59.1 | 53.5 | 45.1 | 56.4 |
| Group | ADM + SA + 6 | ADM + SA + 7 | ADM + SA + 8 | ADM + SA + 9 | ADM + SB + 1 | ADM + SB + 2 | ADM + SB + 3 | ADM + SB + 4 | ADM + SB + 5 |
| Inhibition rate % | 77.8 | 63.2 | 67.3 | 65.1 | 64.6 | 58.7 | 50.6 | 54.6 | 49.5 |
| Group | ADM + SB + 6 | ADM + SB + 7 | ADM + SB + 8 | ADM + SB + 9 | ADM + SC + 1 | ADM + SC + 2 | ADM + SC + 3 | ADM + SC + 4 | ADM + SC + 5 |
| Inhibition rate % | 71.3 | 63.2 | 76.1 | 71 | 33.1 | 38.2 | 31.6 | 33.6 | 33.1 |
| Group | ADM + SC + 6 | ADM + SC + 7 | ADM + SC + 8 | ADM + SC + 9 | PD1 + SA + 1 | PD1 + SA + 2 | PD1 + SA + 3 | PD1 + SA + 4 | PD1 + SA + 5 |
| Inhibition rate % | 31.4 | 33.5 | 31.8 | 34.6 | 89.1 | 74.8 | 72.1 | 73.1 | 77.2 |
| Group | PD1 + SA + 6 | PD1 + SA + 7 | PD1 + SA + 8 | PD1 + SA + 9 | PD1 + SB + 1 | PD1 + SB + 2 | PD1 + SB + 3 | PD1 + SB + 4 | PD1 + SB + 5 |
| Inhibition rate % | 90.3 | 81.1 | 82.4 | 80.5 | 81.9 | 75.7 | 69.1 | 71.4 | 74.2 |
| Group | PD1 + SB + 6 | PD1 + SB + 7 | PD1 + SB + 8 | PD1 + SB + 9 | PD1 + SC + 1 | PD1 + SC + 2 | PD1 + SC + 3 | PD1 + SC + 4 | PD1 + SC + 5 |
| Inhibition rate % | 91.2 | 81.4 | 83.1 | 80.1 | 50.1 | 52.3 | 52.4 | 55.1 | 51.8 |
| Group | PD1 + SC + 6 | PD1 + SC + 7 | PD1 + SC + 8 | PD1 + SC + 9 | | ADM | | PD1 | |
| Inhibition rate % | 49.1 | 50.6 | 59.7 | 55.7 | | 32.1 | | 47.4 | |

Example 5: Experiment on Liver Cancer Mice heps cells were obtained from the Cell Resource Center of Shanghai Institutes for Biological Sciences, Chinese Academy of Sciences; SPF-grade C57BL/6J mice weighing 18-20 grams were purchased from the Animal Experiment Center of Yangzhou University.

The above-mentioned experimental objects were injected into the stomach of C57BL/6J mice by intragastric administration at a dosage calculated according to the amount of 0.01 g of mineral material for each mouse, once every two days for a total of two weeks. On Day 15, the heps tumor cells were counted by a hemocytometer, then adjusted to $5\times10^6$/ml, and inoculated subcutaneously in the axilla of the right forelimb of the mouse (0.1 ml/mouse) to establish a tumor model. 25 days after tumor implantation and 24 h after the last administration, they were killed by dislocation of the cervical vertebra, and the tumor was stripped off and weighed. The tumor inhibition rate of the mineral material and probiotic mineral material composite preparation was calculated according to the change of tumor weight to evaluate the therapeutic effect of the tumor. The results are shown in the table below:

Example 6: Experiment on Lung Cancer Mice

LLC cells were obtained from the Cell Resource Center of Shanghai Institutes for Biological Sciences, Chinese Academy of Sciences; SPF-grade C57BL/6J mice weighing 18-20 grams were purchased from the Animal Experiment Center of Yangzhou University.

The above-mentioned experimental objects were injected into the stomach of C57BL/6J mice by intragastric administration at a dosage calculated according to the amount of 0.01 g of mineral material for each mouse, once every two days for a total of two weeks. On Day 15, the LLC tumor cells were counted by a hemocytometer, then adjusted to $5\times10^6$/ml, and inoculated subcutaneously in the axilla of the right forelimb of the mouse (0.1 ml/mouse) to establish a tumor model. 25 days after tumor implantation and 24 h after the last administration, they were killed by dislocation of the cervical vertebra, and the tumor was stripped off and weighed. The tumor inhibition rate of the mineral material and probiotic mineral material composite preparation was calculated according to the change of tumor weight to evaluate the therapeutic effect of the tumor. The results are shown in the table below:

| Group | PBS | A | B | C | 1 | 2 | 3 | 4 | 5 |
|---|---|---|---|---|---|---|---|---|---|
| Inhibition rate % | 0 | 22.6 | 20.1 | 0 | 34.6 | 30.8 | 20.3 | 24.8 | 25.1 |
| Group | 6 | 7 | 8 | 9 | FA + 1 | FA + 2 | FA + 3 | FA + 4 | FA + 5 |
| Inhibition rate % | 29.8 | 25.9 | 26.9 | 25.8 | 40.9 | 25.7 | 24.7 | 28.8 | 34.2 |
| Group | FA + 6 | FA + 7 | FA + 8 | FA + 9 | FB + 1 | FB + 2 | FB + 3 | FB + 4 | FB + 5 |
| Inhibition rate % | 41.9 | 34.3 | 35.9 | 35.8 | 40.3 | 24.6 | 24.1 | 26.2 | 30.7 |
| Group | FB + 6 | FB + 7 | FB + 8 | FB + 9 | FC + 1 | FC + 2 | FC + 3 | FC + 4 | FC + 5 |
| Inhibition rate % | 39.2 | 33.6 | 36 | 35.5 | 12.6 | 5.1 | 4.3 | 7.4 | 8.5 |
| Group | FC + 6 | FC + 7 | FC + 8 | FC + 9 | SA + 1 | SA + 2 | SA + 3 | SA + 4 | SA + 5 |
| Inhibition rate % | 13.2 | 9.7 | 12.5 | 11.1 | 66.2 | 40.6 | 37.6 | 27.8 | 44.3 |
| Group | SA + 6 | SA + 7 | SA + 8 | SA + 9 | SB + 1 | SB + 2 | SB + 3 | SB + 4 | SB + 5 |
| Inhibition rate % | 69.5 | 54.3 | 57.3 | 54.9 | 60.6 | 45.1 | 33.5 | 39.4 | 41.9 |
| Group | SB + 6 | SB + 7 | SB + 8 | SB + 9 | SC + 1 | SC + 2 | SC + 3 | SC + 4 | SC + 5 |
| Inhibition rate % | 66.4 | 53.2 | 56.1 | 52.1 | 0 | 0 | 0 | 0 | 0 |
| Group | SC + 6 | SC + 7 | SC + 8 | SC + 9 | ADM + SA + 1 | ADM + SA + 2 | ADM + SA + 3 | ADM + SA + 4 | ADM + SA + 5 |
| Inhibition rate % | 0 | 0 | 0 | 0 | 77.2 | 55.9 | 44.9 | 52.9 | 55 |
| Group | ADM + SA + 6 | ADM + SA + 7 | ADM + SA + 8 | ADM + SA + 9 | ADM + SB + 1 | ADM + SB + 2 | ADM + SB + 3 | ADM + SB + 4 | ADM + SB + 5 |
| Inhibition rate % | 76.9 | 61.7 | 64.8 | 63.5 | 68.8 | 53.6 | 43.7 | 48.6 | 52.7 |
| Group | ADM + SB + 6 | ADM + SB + 7 | ADM + SB + 8 | ADM + SB + 9 | ADM + SC + 1 | ADM + SC + 2 | ADM + SC + 3 | ADM + SC + 4 | ADM + SC + 5 |
| Inhibition rate % | 75.9 | 62.9 | 65.3 | 61.1 | 25.4 | 25.9 | 26.7 | 26.6 | 28.6 |
| Group | ADM + SC + 6 | ADM + SC + 7 | ADM + SC + 8 | ADM + SC + 9 | PD1 + SA + 1 | PD1 + SA + 2 | PD1 + SA + 3 | PD1 + SA + 4 | PD1 + SA + 5 |
| Inhibition rate % | 28.2 | 32.1 | 24.9 | 27.9 | 88.5 | 65.7 | 58.3 | 62.7 | 66.9 |
| Group | PD1 + SA + 6 | PD1 + SA + 7 | PD1 + SA + 8 | PD1 + SA + 9 | PD1 + SB + 1 | PD1 + SB + 2 | PD1 + SB + 3 | PD1 + SB + 4 | PD1 + SB + 5 |
| Inhibition rate % | 89.3 | 72.4 | 75.9 | 72.7 | 79.5 | 65.3 | 56.6 | 60.3 | 65.3 |
| Group | PD1 + SB + 6 | PD1 + SB + 7 | PD1 + SB + 8 | PD1 + SB + 9 | PD1 + SC + 1 | PD1 + SC + 2 | PD1 + SC + 3 | PD1 + SC + 4 | PD1 + SC + 5 |
| Inhibition rate % | 85.6 | 73.9 | 75.9 | 74.1 | 34.9 | 35.2 | 40.5 | 42.9 | 39.8 |
| Group | PD1 + SC + 6 | PD1 + SC + 7 | PD1 + SC + 8 | PD1 + SC + 9 | | ADM | | PD1 | |
| Inhibition rate % | 40.9 | 43.2 | 43.9 | 36.3 | | 26.1 | | 38.1 | |

| Group | PBS | A | B | C | 1 | 2 | 3 | 4 | 5 |
|---|---|---|---|---|---|---|---|---|---|
| Inhibition rate % | 0 | 23.6 | 18.9 | 0 | 40 | 28.8 | 22.4 | 19.2 | 26 |
| Group | 6 | 7 | 8 | 9 | FA + 1 | FA + 2 | FA + 3 | FA + 4 | FA + 5 |
| Inhibition rate % | 30.9 | 26.4 | 27.9 | 26.5 | 41.6 | 29.6 | 26.2 | 28.9 | 34.5 |
| Group | FA + 6 | FA + 7 | FA + 8 | FA + 9 | FB + 1 | FB + 2 | FB + 3 | FB + 4 | FB + 5 |
| Inhibition rate % | 43.8 | 35.6 | 38.2 | 36.9 | 41 | 25.5 | 24.4 | 28.5 | 32.9 |
| Group | FB + 6 | FB + 7 | FB + 8 | FB + 9 | FC + 1 | FC + 2 | FC + 3 | FC + 4 | FC + 5 |
| Inhibition rate % | 39.4 | 33.4 | 37.5 | 36.3 | 13.9 | 7.2 | 5.1 | 8.2 | 9.8 |
| Group | FC + 6 | FC + 7 | FC + 8 | FC + 9 | SA + 1 | SA + 2 | SA + 3 | SA + 4 | SA + 5 |
| Inhibition rate % | 15.2 | 10.9 | 12.8 | 12.7 | 65.6 | 45.6 | 37.6 | 32 | 44.8 |
| Group | SA + 6 | SA + 7 | SA + 8 | SA + 9 | SB + 1 | SB + 2 | SB + 3 | SB + 4 | SB + 5 |
| Inhibition rate % | 70.4 | 55.8 | 57.8 | 55.9 | 61.3 | 46.6 | 35.5 | 41.2 | 43.5 |
| Group | SB + 6 | SB + 7 | SB + 8 | SB + 9 | SC + 1 | SC + 2 | SC + 3 | SC + 4 | SC + 5 |
| Inhibition rate % | 68.7 | 54.7 | 56.2 | 53.4 | 0 | 0 | 0 | 0 | 0 |
| Group | SC + 6 | SC + 7 | SC + 8 | SC + 9 | ADM + SA + 1 | ADM + SA + 2 | ADM + SA + 3 | ADM + SA + 4 | ADM + SA + 5 |
| Inhibition rate % | 0 | 0 | 0 | 0 | 78.8 | 57.1 | 46.6 | 54.3 | 56.3 |
| Group | ADM + SA + 6 | ADM + SA + 7 | ADM + SA + 8 | ADM + SA + 9 | ADM + SB + 1 | ADM + SB + 2 | ADM + SB + 3 | ADM + SB + 4 | ADM + SB + 5 |
| Inhibition rate % | 77.9 | 62.9 | 65.4 | 64.4 | 68.7 | 56.1 | 44.9 | 49.3 | 54.6 |
| Group | ADM + SB + 6 | ADM + SB + 7 | ADM + SB + 8 | ADM + SB + 9 | ADM + SC + 1 | ADM + SC + 2 | ADM + SC + 3 | ADM + SC + 4 | ADM + SC + 5 |
| Inhibition rate % | 77.5 | 63.8 | 67.5 | 61.4 | 27.1 | 26.9 | 26.8 | 27.4 | 28.8 |
| Group | ADM + SC + 6 | ADM + SC + 7 | ADM + SC + 8 | ADM + SC + 9 | PD1 + SA + 1 | PD1 + SA + 2 | PD1 + SA + 3 | PD1 + SA + 4 | PD1 + SA + 5 |
| Inhibition rate % | 29.9 | 32.5 | 25.4 | 28.2 | 88.7 | 66.9 | 58.9 | 63.2 | 66.9 |
| Group | PD1 + SA + 6 | PD1 + SA + 7 | PD1 + SA + 8 | PD1 + SA + 9 | PD1 + SB + 1 | PD1 + SB + 2 | PD1 + SB + 3 | PD1 + SB + 4 | PD1 + SB + 5 |
| Inhibition rate % | 89.5 | 73.4 | 76.6 | 73.1 | 79.6 | 66.3 | 57.6 | 62.6 | 66.8 |
| Group | PD1 + SB + 6 | PD1 + SB + 7 | PD1 + SB + 8 | PD1 + SB + 9 | PD1 + SC + 1 | PD1 + SC + 2 | PD1 + SC + 3 | PD1 + SC + 4 | PD1 + SC + 5 |
| Inhibition rate % | 85.8 | 75.3 | 76.3 | 75.1 | 37.1 | 35.9 | 41.8 | 43.9 | 40.5 |
| Group | PD1 + SC + 6 | PD1 + SC + 7 | PD1 + SC + 8 | PD1 + SC + 9 | | ADM | | PD1 | |
| Inhibition rate % | 42.6 | 44.7 | 44.3 | 37.6 | | 29.1 | | 41.1 | |

Example 7: Experiment on Cervical Cancer Mice

Hela cells were obtained from the Cell Resource Center of Shanghai Institutes for Biological Sciences, Chinese Academy of Sciences; SPF-grade BALB/c Nude mice weighing 18-20 grams were purchased from the Animal Experiment Center of Yangzhou University.

The above-mentioned experimental objects were injected into the stomach of BALB/c Nude mice by intragastric administration at a dosage calculated according to the amount of 0.01 g of mineral material for each mouse, once every two days for a total of two weeks. On Day 15, the Hela tumor cells were counted by a hemocytometer, then adjusted to $5 \times 10^6$/ml, and inoculated subcutaneously in the axilla of the right forelimb of the mouse (0.1 ml/mouse) to establish a tumor model. 30 days after tumor implantation and 24 h after the last administration, they were killed by dislocation of the cervical vertebra, and the tumor was stripped off and weighed. The tumor inhibition rate of the mineral material and probiotic mineral material composite preparation was calculated according to the change of tumor weight to evaluate the therapeutic effect of the tumor. The results are shown in the table below:

| Group | PBS | A | B | C | 1 | 2 | 3 | 4 | 5 |
|---|---|---|---|---|---|---|---|---|---|
| Inhibition rate % | 0 | 20.9 | 16.1 | 0 | 31.3 | 17.2 | 15.2 | 10.1 | 22.6 |
| Group | 6 | 7 | 8 | 9 | FA + 1 | FA + 2 | FA + 3 | FA + 4 | FA + 5 |
| Inhibition rate % | 27.5 | 23.2 | 24.3 | 24.2 | 38.2 | 24.1 | 23.4 | 16.4 | 27.5 |
| Group | FA + 6 | FA + 7 | FA + 8 | FA + 9 | FB + 1 | FB + 2 | FB + 3 | FB + 4 | FB + 5 |
| Inhibition rate % | 30.5 | 26.4 | 25.3 | 27.4 | 37.7 | 23.6 | 21.4 | 24.5 | 29.6 |
| Group | FB + 6 | FB + 7 | FB + 8 | FB + 9 | FC + 1 | FC + 2 | FC + 3 | FC + 4 | FC + 5 |
| Inhibition rate % | 36.3 | 30.7 | 34.4 | 32.2 | 11.6 | 4.4 | 2.3 | 5.5 | 6.3 |

-continued

| Group | FC + 6 | FC + 7 | FC + 8 | FC + 9 | SA + 1 | SA + 2 | SA + 3 | SA + 4 | SA + 5 |
|---|---|---|---|---|---|---|---|---|---|
| Inhibition rate % | 17.8 | 7.6 | 9.4 | 8.9 | 58.6 | 44.4 | 35.4 | 30.3 | 41.8 |
| Group | SA + 6 | SA + 7 | SA + 8 | SA + 9 | SB + 1 | SB + 2 | SB + 3 | SB + 4 | SB + 5 |
| Inhibition rate % | 68.8 | 52.9 | 54.8 | 52.7 | 58.6 | 42.2 | 30.9 | 37.7 | 39.6 |
| Group | SB + 6 | SB + 7 | SB + 8 | SB + 9 | SC + 1 | SC + 2 | SC + 3 | SC + 4 | SC + 5 |
| Inhibition rate % | 65.4 | 50.5 | 53.5 | 50.4 | 0 | 0 | 0 | 0 | 0 |
| Group | SC + 6 | SC + 7 | SC + 8 | SC + 9 | ADM + SA + 1 | ADM + SA + 2 | ADM + SA + 3 | ADM + SA + 4 | ADM + SA + 5 |
| Inhibition rate % | 0 | 0 | 0 | 0 | 74.7 | 53.9 | 43.3 | 50.7 | 53.3 |
| Group | ADM + SA + 6 | ADM + SA + 7 | ADM + SA + 8 | ADM + SA + 9 | ADM + SB + 1 | ADM + SB + 2 | ADM + SB + 3 | ADM + SB + 4 | ADM + SB + 5 |
| Inhibition rate % | 75.2 | 60.6 | 62.9 | 61 | 65.5 | 51.7 | 41.3 | 46.4 | 51.3 |
| Group | ADM + SB + 6 | ADM + SB + 7 | ADM + SB + 8 | ADM + SB + 9 | ADM + SC + 1 | ADM + SC + 2 | ADM + SC + 3 | ADM + SC + 4 | ADM + SC + 5 |
| Inhibition rate % | 73.6 | 60.8 | 63.7 | 59.3 | 23.5 | 23.2 | 24.3 | 24.2 | 26.3 |
| Group | ADM + SC + 6 | ADM + SC + 7 | ADM + SC + 8 | ADM + SC + 9 | PD1 + SA + 1 | PD1 + SA + 2 | PD1 + SA + 3 | PD1 + SA + 4 | PD1 + SA + 5 |
| Inhibition rate % | 26.6 | 28.7 | 23.3 | 25.6 | 86.8 | 63.8 | 55.9 | 60.5 | 63.7 |
| Group | PD1 + SA + 6 | PD1 + SA + 7 | PD1 + SA + 8 | PD1 + SA + 9 | PD1 + SB + 1 | PD1 + SB + 2 | PD1 + SB + 3 | PD1 + SB + 4 | PD1 + SB + 5 |
| Inhibition rate % | 86.3 | 71.2 | 73.8 | 70.1 | 76.5 | 64.2 | 53.5 | 57.9 | 62.9 |
| Group | PD1 + SB + 6 | PD1 + SB + 7 | PD1 + SB + 8 | PD1 + SB + 9 | PD1 + SC + 1 | PD1 + SC + 2 | PD1 + SC + 3 | PD1 + SC + 4 | PD1 + SC + 5 |
| Inhibition rate % | 84.2 | 72.6 | 73.6 | 72.9 | 33.4 | 33.9 | 38.3 | 41.4 | 37.4 |
| Group | PD1 + SC + 6 | PD1 + SC + 7 | PD1 + SC + 8 | PD1 + SC + 9 | | ADM | | PD1 | |
| Inhibition rate % | 38.9 | 41.3 | 41.7 | 34.8 | | 24.1 | | 39.1 | |

Example 8: Experiment on Mice with Diarrhea

SPF-grade C57BL/6J mice weighing 18-20 grams were purchased from the Animal Experiment Center of Yangzhou University.

After the mice were fasted for 4 h, 0.5 ml (of *senna* leaf extract) was administered every 12 h for four consecutive days, and the administration was stopped after the mice were observed to have obvious diarrhea symptoms. The prepared experimental object gavage liquids were injected into the stomach of C57BL/6J mice by intragastric administration at a dosage calculated according to the amount of 0.05 g of mineral material for each mouse, twice a day for a total of 2 days. After 3 days, the treatment effect was counted, and if the mice no longer had diarrhea on the last day, they were considered cured.

Example 9: Experiment on Ulcerative Colitis Mouse Model

SPF-grade C57BL/6J mice weighing 18-20 grams were purchased from the Animal Experiment Center of Yangzhou University.

After drinking 3% DSS aqueous solution for 7 days, the mice were observed to have significant weight loss, diarrhea and hematochezia. The prepared experimental object gavage liquids were injected into the stomach of C57BL/6J mice by intragastric administration at a dosage calculated according to the amount of 0.05 g of mineral material for each mouse, once a day for a total of 7 days. After 7 days, the treatment effect was counted, and if on the last day, the mice no longer had diarrhea and hematochezia and the body weight recovered, they were considered cured.

| Group | PBS | A | B | C | 1 | 2 | 3 | 4 | 5 |
|---|---|---|---|---|---|---|---|---|---|
| Cure rate % | 30 | 70 | 60 | 0 | 70 | 60 | 50 | 50 | 60 |
| Group | 6 | 7 | 8 | 9 | FA + 1 | FA + 2 | FA + 3 | FA + 4 | FA + 5 |
| Cure rate % | 70 | 70 | 60 | 70 | 80 | 70 | 60 | 60 | 70 |
| Group | FA + 6 | FA + 7 | FA + 8 | FA + 9 | FB + 1 | FB + 2 | FB + 3 | FB + 4 | FB + 5 |
| Cure rate % | 70 | 70 | 70 | 80 | 80 | 70 | 60 | 60 | 60 |
| Group | FB + 6 | FB + 7 | FB + 8 | FB + 9 | FC + 1 | FC + 2 | FC + 3 | FC + 4 | FC + 5 |
| Cure rate % | 70 | 70 | 70 | 80 | 40 | 30 | 40 | 30 | 40 |
| Group | FC + 6 | FC + 7 | FC + 8 | FC + 9 | SA + 1 | SA + 2 | SA + 3 | SA + 4 | SA + 5 |
| Cure rate % | 20 | 30 | 30 | 40 | 100 | 100 | 100 | 100 | 100 |
| Group | SA + 6 | SA + 7 | SA + 8 | SA + 9 | SB + 1 | SB + 2 | SB + 3 | SB + 4 | SB + 5 |
| Cure rate % | 100 | 100 | 100 | 100 | 100 | 100 | 100 | 100 | 100 |
| Group | SB + 6 | SB + 7 | SB + 8 | SB + 9 | SC + 1 | SC + 2 | SC + 3 | SC + 4 | SC + 5 |
| Cure rate % | 100 | 100 | 100 | 100 | 40 | 30 | 40 | 30 | 30 |
| Group | SC + 6 | | | SC + 7 | | SC + 8 | | SC + 9 | |
| Cure rate % | 20 | | | 30 | | 30 | | 40 | |

| Group | PBS | A | B | C | 1 | 2 | 3 | 4 | 5 |
|---|---|---|---|---|---|---|---|---|---|
| Cure rate % | 0 | 40 | 40 | 0 | 50 | 40 | 40 | 40 | 40 |
| Group | 6 | 7 | 8 | 9 | FA + 1 | FA + 2 | FA + 3 | FA + 4 | FA + 5 |
| Cure rate % | 50 | 40 | 50 | 50 | 60 | 50 | 50 | 60 | 50 |
| Group | FA + 6 | FA + 7 | FA + 8 | FA + 9 | FB + 1 | FB + 2 | FB + 3 | FB + 4 | FB + 5 |
| Cure rate % | 70 | 50 | 60 | 60 | 60 | 60 | 60 | 70 | 50 |
| Group | FB + 6 | FB + 7 | FB + 8 | FB + 9 | FC + 1 | FC + 2 | FC + 3 | FC + 4 | FC + 5 |
| Cure rate % | 70 | 6C | 80 | 70 | 0 | 0 | 0 | 0 | 0 |
| Group | FC + 6 | FC + 7 | FC + 8 | FC + 9 | SA + 1 | SA + 2 | SA + 3 | SA + 4 | SA + 5 |
| Cure rate % | 0 | 0 | 0 | 0 | 90 | 70 | 80 | 80 | 70 |
| Group | SA + 6 | SA + 7 | SA + 8 | SA + 9 | SB + 1 | SB + 2 | SB + 3 | SB + 4 | SB + 5 |
| Cure rate % | 90 | 80 | 90 | 90 | 100 | 90 | 80 |  | 90 |
| Group | SB + 6 | SB + 7 | SB + 8 | SB + 9 | SC + 1 | SC + 2 | SC + 3 | SC + 4 | SC + 5 |
| Cure rate % | 90 | 90 | 100 | 90 | 0 | 0 | 0 | 0 | 0 |
| Group | SC + 6 | | SC + 7 | | SC + 8 | | SC + 9 | | |
| Cure rate % | 0 | | 0 | | 0 | | 0 | | |

Example 10: Experiment that Microorganisms Form Film on the Surface of Montmorillonite after being Treated Under Different Conditions 3-Triethoxysilylpropyl succinic anhydride (TESSA) was used to modify montmorillonite, and the steps were as follows: 1 g of montmorillonite was dispersed in 100 mL of ddH2O, shaken gently for 30 min, and then added with 1 mL of TESSA. The mixture was placed in a reflux device and heated and stirred at 60° C. for 24 h. Afterwards, the product was washed with ethanol and dd $H_2O$ to obtain TESSA-MMT. TESSA, with a chemical formula of $C_{13}H_{24}O_6Si$, was purchased from Macklin with a reagent number of T849358-5g.

3-Aminopropyltriethoxysilane (APTES) was used to modify montmorillonite, and the steps were as follows: 1 g of montmorillonite was dispersed in 100 mL of ddH2O, shaken gently for 30 min, and then added with 1.6 mL of APTES. The mixture was placed in a reflux device and heated and stirred at 60° C. for 24 h. Afterwards, the product was washed with ethanol and dd H2O to obtain APTES-MMT. APTES, with a chemical formula of $H_2NCH_2CH_2CH_2Si(OC_2H_5)_3$, was purchased from 3Achem with a reagent number of A11384.

Therefore, three kinds of montmorillonites were obtained, and their surface charge properties were as follows: the untreated montmorillonite had a positively charge on the surface in an acidic environment, the APTES-treated montmorillonite always had a positively charge on the surface, and TESSA-treated montmorillonite always did not have a positively charge on the surface.

The pH of the culture medium was adjusted to around 7. *Lactobacillus acidophilus* was cultured with untreated montmorillonite, and it was found that *Lactobacillus acidophilus* could not form a biofilm on the montmorillonite particles. However, *Escherichia coli* and *Bacillus subtilis* were able to form biofilms on the untreated montmorillonite particles when the pH of the culture medium for *Escherichia coli* and *Bacillus subtilis* was adjusted below 5.5.

The TESSA-treated montmorillonite can maintain negative charge at pH 5.5. When *Lactobacillus acidophilus* was co-cultured with TESSA-MMT, *Lactobacillus acidophilus* did not form a biofilm on the particle surface.

Figure 3:
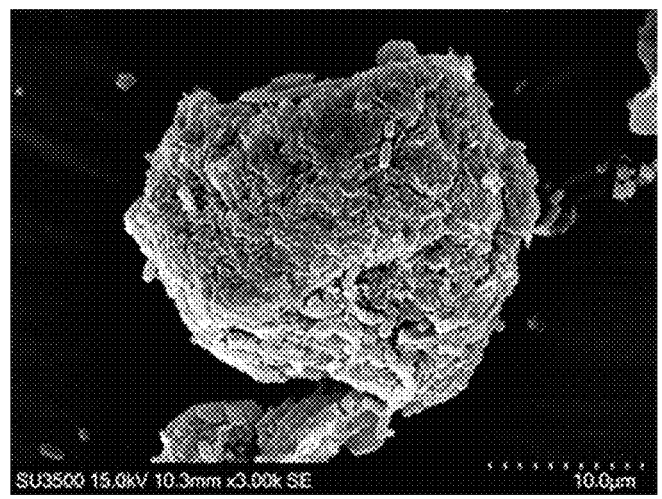
FIG. 3 is an electron micrograph of the biofilm of *Escherichia coli* formed on the surface of APTES-treated montmorillonite.

The APTES-treated montmorillonite always had a positively charge on the surface, and *Lactobacillus acidophilus, Escherichia coli*, and *Bacillus subtilis* can all form biofilms on the surface of APTES-MMT. FIG. 3 is an electron micrograph of the biofilm of *Escherichia coli* formed on the surface of APTES-treated montmorillonite, while *Escherichia coli* and *Bacillus subtilis* cannot form a biofilm on the surface of the unmodified montmorillonite.

The above experimental results indicate that the positive charge on the surface of the particles plays a key role in the biofilm formation process. The underlying mechanism by which montmorillonite selectively supports the formation of biofilms by acidogenic microorganisms on its surface may be due to the acidic environment generated by specific acidogenic microorganisms, which converts accordingly to a positive surface charge.

The concepts, principles and ideas of the present invention have been described in detail above in conjunction with specific implementation methods (including embodiments and examples). Those skilled in the art should understand that the embodiments of the present invention are not limited to the forms given above, and those skilled in the art can make any possible modifications, replacements and equivalents of the steps, methods, devices, and components in the above embodiments after reading the application documents. Such modifications, replacements and equivalents should be considered as falling within the scope of the present invention. The scope of protection of the present invention is defined only by the claims.

The invention claimed is:

1. A composite microsphere with a structure of "bacteria-inorganic material-biofilm", consisting of probiotics, an inorganic material, and a probiotic film, wherein the probiotics are one or more selected from the group consisting of *Lactobacillus, Bifidobacterium, Clostridium butyricum,* and *Enterococcus faecalis,* and the inorganic material is selected from the group consisting of cation exchange resin with a microporous structure, fluorite, dioctahedral smectites subgroup, trioctahedral smectites subgroup, diatomite, kaolin, attapulgite, illite, chlorite, sepiolite, zeolite, talc, and a mixture thereof;

wherein the probiotics are adsorbed on a surface of the inorganic material and form the probiotic biofilm.

2. The composite microsphere according to claim 1, wherein the composite microsphere is obtained as follows:
   S1, culturing the probiotics at 25-40° C., 0-200 rpm for 10 min-4 h to obtain a probiotic culture solution;
   S2, stirring the inorganic material in isotonic buffer for 10 min-1 h to obtain an inorganic material suspension;
   S3, mixing the probiotic culture solution with the inorganic material suspension at a ratio of 10:1-1:10 and performing an anaerobic culture at 25-40° C., 0-200 rpm for 4 h-48 h; and
   S4, separating and purifying.

3. The composite microsphere according to claim 1, wherein the composite microsphere is formulated into a form selected from the group consisting of a brewable solid form, a chewable solid form, an injectable injection, and an oral liquid.

4. A therapeutic drug for treating a malignant tumor, wherein the drug comprises the composite microsphere according to claim 1.

\* \* \* \* \*